Dec. 30, 1952  H. A. G. FORNELIUS  2,623,760
VEHICLE LOAD BINDER TENSION DEVICE
Filed Feb. 6, 1952  3 Sheets-Sheet 1
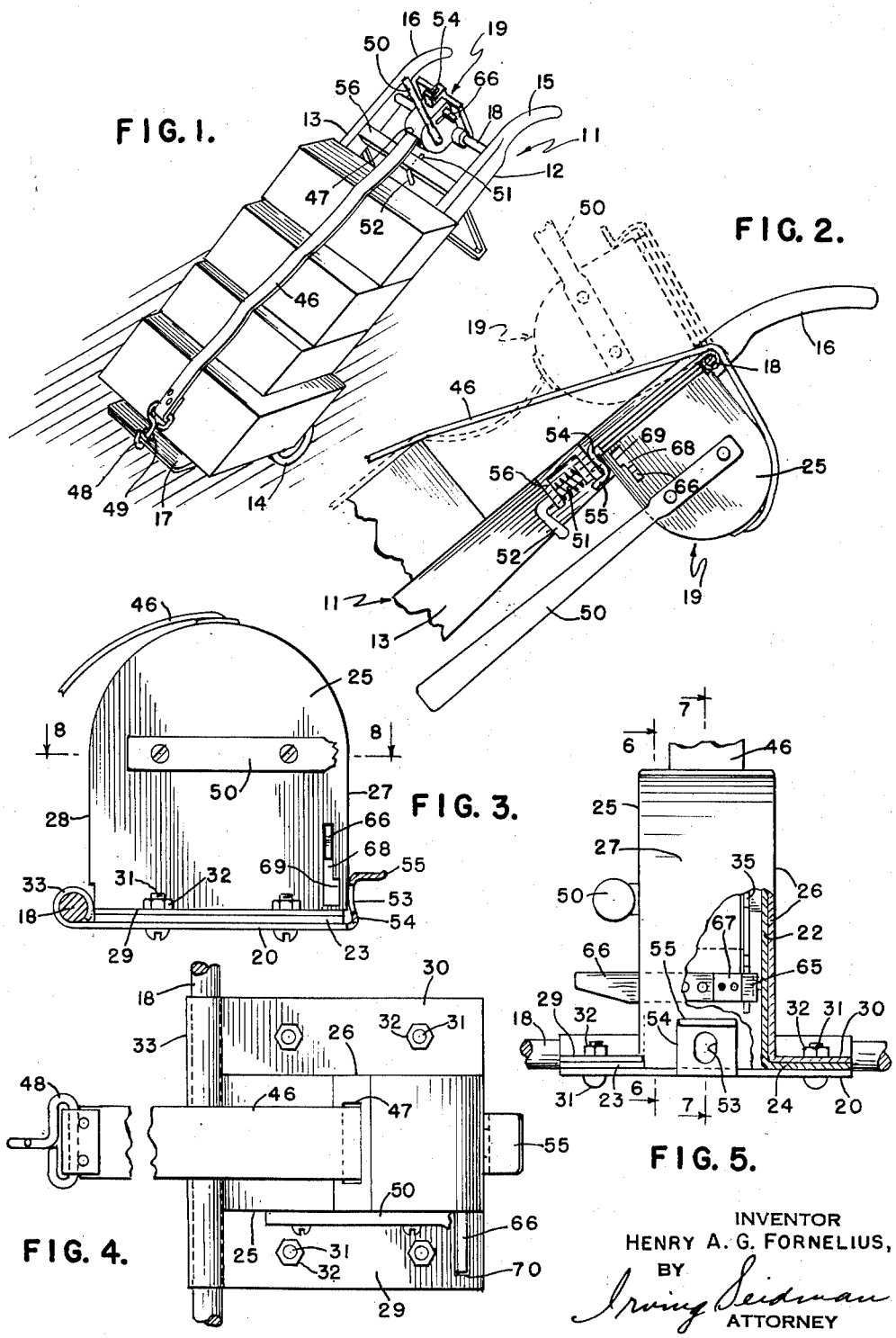
INVENTOR
HENRY A. G. FORNELIUS,
BY
Irving Seidman
ATTORNEY Dec. 30, 1952     H. A. G. FORNELIUS     2,623,760
VEHICLE LOAD BINDER TENSION DEVICE
Filed Feb. 6, 1952     3 Sheets-Sheet 2
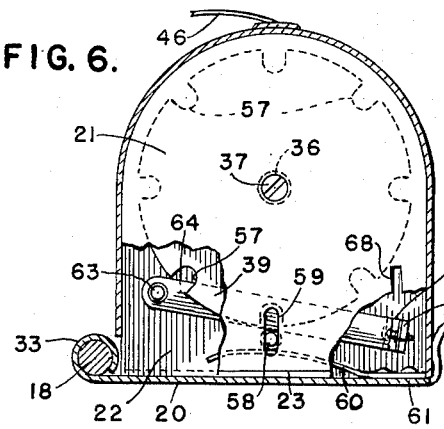
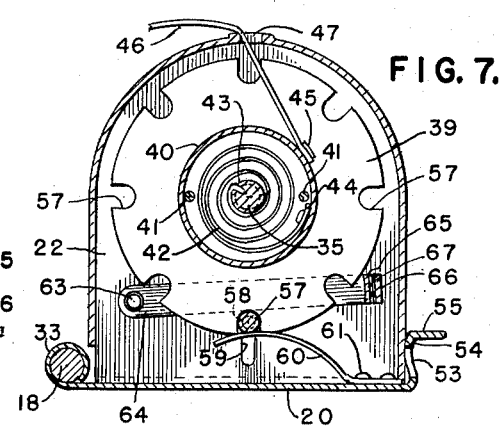
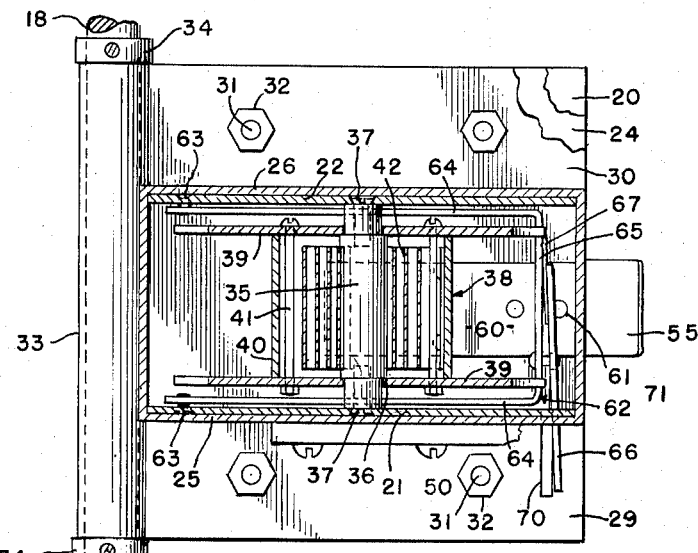
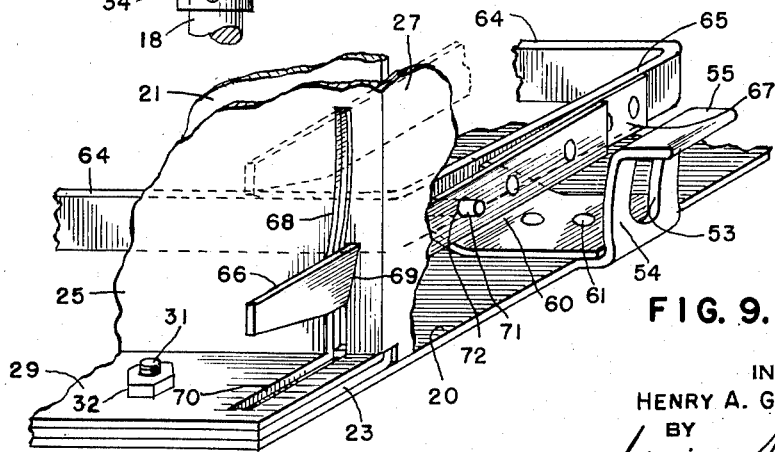
INVENTOR
HENRY A. G. FORNELIUS,
BY
*Irving Seidman*
ATTORNEY Dec. 30, 1952

H. A. G. FORNELIUS 2,623,760

VEHICLE LOAD BINDER TENSION DEVICE

Filed Feb. 6, 1952

INVENTOR
HENRY A. G. FORNELIUS,
BY
Irving Seidman
ATTORNEY

Patented Dec. 30, 1952

2,623,760

UNITED STATES PATENT OFFICE 2,623,760

VEHICLE LOAD BINDER TENSION DEVICE

Henry A. G. Fornelius, Clifton, N. J., assignor of one-half to Frederick E. Benjamin, Rutherford, N. J.

Application February 6, 1952, Serial No. 270,178

8 Claims. (Cl. 280—179)

1

This invention relates to a tension device having a strap tie-on means for securely fastening cartons and like articles to carriers such as hand trucks, platform trucks, skids, pallets and the like and has particular reference to a device which is attached to a hand truck and the like and is adapted to swing about a pivotal connection with said hand truck to tighten a strap which engages around the articles to be carried upon the various trucks or carriers above mentioned.

An object of this invention resides in the provision of a tensioning device which consists of a flexible strap secured at one end to a drum or spring actuated wind-up spool mounted within a housing which is in turn pivotally mounted upon a cross-rod secured between the handles of the hand truck or to the side bars of similar carriers. The said strap being provided, at its free end, with a hook which, with the strap, is drawn out from the said housing and suitably hooked to the carrier. When so hooked the strap rests lightly upon cartons, packages or other articles stacked upon the carrier. The housing at this point is tilted forward, and the wind-up spool is locked against rotation. The housing is then swung around its pivotal mounting thereby tensioning the strap and binding same tightly against the cartons or packages to hold them securely in place during any movement or manipulation of the carrier.

Another object of this invention is the provision therein of a circular spring actuating means to automatically wind the strap upon the wind-up spool when the hooked end of the strap is released from the nose of the hand truck.

A further object of this invention is the provision therein of a spring actuated means for locking the wind-up spool against rotation.

A still further object of this invention includes a spring actuated means for releasing the wind-up spool and permitting its rotation to unwind or rewind the strap and means for holding the said releasing means in its unlocking position.

An additional object of this invention is the provision therein of a means for locking the housing in a retracted position to hold the strap in its tightly stretched or tensioned condition.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

2

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawing, in which:

Fig. 1 is a perspective view of a hand truck and shows packages stacked thereon and a tensioning device, embodying the principles of this invention upon a hand truck.

Fig. 2 is an enlarged detail of the handle portion of a hand truck and shows the tension device in its retracted or strap tensioning position. The sectional portion of the hand truck is taken approximately along a central line of the truck.

Fig. 3 is a side elevational view of the tensioning device and shows a part broken away and a portion in section.

Fig. 4 is a top or plan view of same.

Fig. 5 is a rear elevational view shown partly in section.

Fig. 6 is an elevation, in section, taken approximately in a plane indicated by the line 6—6 of Fig. 5.

Fig. 7 is also a sectional elevation taken along the line 7—7 of Fig. 5.

Fig. 8 is an enlarged, sectional plan view and is taken along the line 8—8 of Fig. 3, parts of same being broken away.

Fig. 9 is an enlarged, fragmentary, perspective view of a means adapted to actuate the locking or unlocking means engageable with the wind-up spool.

Figure 10:
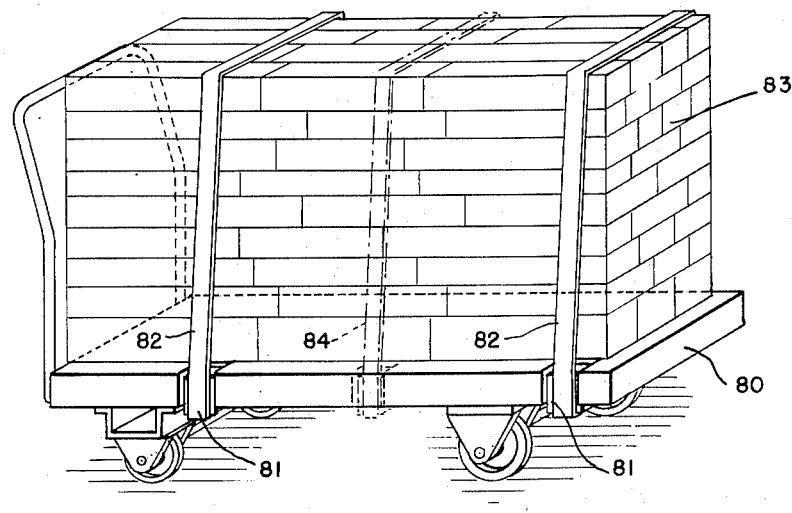
Fig. 10 is a perspective view of a loaded platform truck having tension devices attached thereto.

Referring now to the drawing in detail wherein similar reference numerals refer to like parts throughout, 11 designates, in general, a hand truck having side bars 12 and 13 and wheels 14. The upper terminals of the side bars 12 and 13 are formed with arcuate handles 15 and 16 respectively. A nose piece or lifting ledge 17 projects from the lower ends of the side bars 12 and 13. Regulation cross bars (not shown) are provided between the side bars 12 and 13. A cross rod 18, circular in cross section is secured between the side bars 12 and 13 in juxtaposition to the handles 16 and 17.

Upon the said cross rod 18 there is, swingingly mounted, a tensioning device, generally designated as 19 and comprising a base plate 20 to which there is attached a pair of upstanding side plates 21 and 22 having angular flanges 23 and 24 respectively, which rest upon the base plate 20 (Figs. 5 and 8). An encasing unit open at its bottom and having side walls 25 and 26 and front and rear walls 27 and 28 connecting the said side walls, is adapted to engage over the said upstanding side plates 21 and 22 enclosing same to form a housing. The bottom edges of the said side walls 25 and 26 have angular flanges 29 and 30 respectively which rest upon the flanges 23 and 24 respectively of the said side plates 21 and 22 respectively. Screws 31 and nuts 32 secure the housing, upstanding side plates 21 and 22 and base plate 20 together. The rear end of the base plate 20 is formed into a tubular shape 33 through which the circular rod 18 engages and provides a bearing around which the tensioning device may swing. Collars 34 (Fig. 8) may be provided to properly space the tensioning device upon the supporting rod 18.

A shaft 35, having shoulder formations 36 at both ends, is mounted against rotation in the upstanding side plates 21 and 22 by means of counter sunk screws 37. Rotatably mounted upon the said shaft 35 and engaging the shoulder formations 36 is a wind-up spool 38 comprising circular side walls 39, a tubular spacer 40 and binding bolts 41 which are adapted to hold the parts together. (Figs. 5, 6, 7 and 8.) Within the tubular portion 40 of the wind-up spool 38 there is a coiled clock-type spring 42 which is secured at one end 43 to the stationary shaft 35 and at its other or outer end 44 to the inner side of the tubular spacer portion 40 of the wind-up spool 38. To the outer surface of the tubular spacer 40 there is attached one end 45 of an elongated flexible strap 46 which extends out through a slot 47 (Fig. 7) and has at its outer free end a hook 48, which hook is adapted to engage, when extended, in an orifice 49 formed in the nose piece 17 of the hand truck.

The clock spring 42 is normally contracted or wound tightly upon itself and coils the strap 46 about the tubular spacer 40 when the outer hook end of the strap 40 is released and uncoils under tension when the strap is withdrawn. In Fig. 1 a series of cartons or packages is shown stacked upon the hand truck and shows the strap engaging the cartons and hooked into the orifice 49 upon the nose piece 17. The tensioning device 19 is shown in its uppermost or forward position with the strap lying slack upon the cartons. (This raised position of the tensioning device is shown by full lines in Fig. 1 and by dotted lines in Fig. 2.) While the tensioning device is in its raised position the strap 46 is drawn out of its housing, over the cartons and hooked in place as shown in Fig. 1. During the process of drawing out the strap 46 the wind-up spool 38 is unlocked and free to rotate, allowing the withdrawal of the strap. When, however, the strap is hooked in position, the wind-up spool 38 is locked (as will be hereinafter fully explained) and by means of a handle rod 50, attached to a side of the tensioning device, the said tensioning device is rotated about its supporting rod 18, and swung around to the position shown by the full lines in Fig. 2, in which position it is locked by means of a spring actuated rod 51 having a handle 52. By this movement of the tensioning device the strap 46 is pulled taut against the cartons and holds same in place and prevents any displacement thereof.

The aforesaid spring actuated rod 51 engages in an orifice 53 formed in a projecting lip 54 which extends upwardly from an end of the base plate 20 (Figs. 1, 2, 5 and 9). The lip 54 has formed upon it an angular flange 55 which acts as a stop and engages against a channeled cross-member 56 (Fig. 1) to which the spring actuated locking rod 51 is attached.

Regarding the means for locking the wind-up spool 38 attention is directed to Figs. 6 and 7. In the said figures there is shown circular side walls 39 of the wind-up spool 38. These side walls are formed, along their circumferences, with spaced notches 57 in which a vertically movable cross pin 58 is adapted to engage. The said cross pin has contracted ends which engage in a vertical slot 59 formed in the upstanding side plates 21 and 22. A flat or leaf spring 60, one end of which is secured to the base plate, as at 61, extends under the cross pin 58 to urge same into a raised position to engage in one of the peripheral slots 57 and lock the wind-up spool in a stationary position. To unlock the wind-up spool there is provided a U-shaped operating bar 62 having legs pivoted at their free ends to the upstanding side plates 21 and 22 by means of pins 63. The legs 64 of the U-shaped operating bar 62 extend forwardly to the cross bar 65 and engage over the said cross pin 58. When the U-shaped bar is depressed the cross pin 58 is forced downwardly and out of the notch 59, in which it has been engaged, thus freeing the wind-up spool 38. To depress the said U-shaped bar 62 there is provided a finger 66 which is attached to the cross bar 65 of the U-shaped bar 62, by means of a flat spring 67 in turn secured to the cross bar 65. The finger 66 extends through a slot 68 in the upstanding side plate 21 and side wall 25 of the housing and is movable in said slot to raise or lower the U-shaped bar 62 and allow the cross pin 58 to move up or down in the slot 59 thus locking or unlocking the wind-up spool. The slot 68 is formed, at its lower end, with an offset or cut out notch 69 in which the finger 66 may engage to hold the U-shaped bar in its lowered position. The flat spring 67 is adapted to urge the finger into the offset or cut out notch 69 (Fig. 9).

In Fig. 9 the slot 68 is shown with a slight curvature to conform to the movement of the finger. However, by widening the slot opening the same may be made in a straight line and a slot 70 may be formed in the flange 29 to allow said flange to pass over the finger 66. A pin 71 is secured to and projects from the cross bar 65 and engages freely through an orifice 72 in the finger 66. The said pin acts as a brace to keep the finger 66 in proper alignment.

In Fig. 10 there is shown a platform truck 80 to the sides of which are tensioning devices 81 having tie-on straps 82 which securely hold cartons 83 upon the platform. In this view two tensioning devices are shown in full lines. However, a third tensioning device 84 may be attached approximately centrally between the tensioning devices shown by the full lines. The central tensioning device is shown by dot-dash lines.

Figure 11:
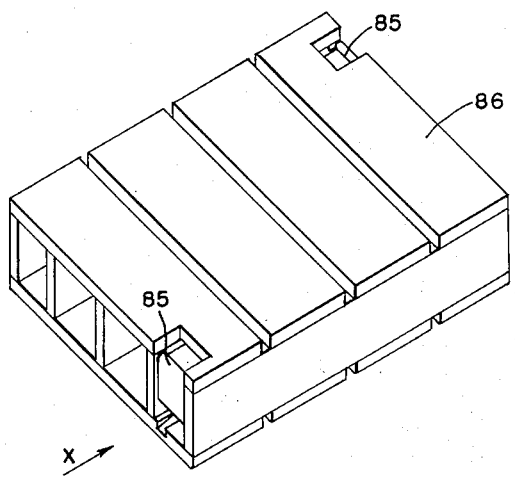
Fig. 11 is an isometric view, enlarged, of a pallet having tension devices attached thereto.
Figure 13:
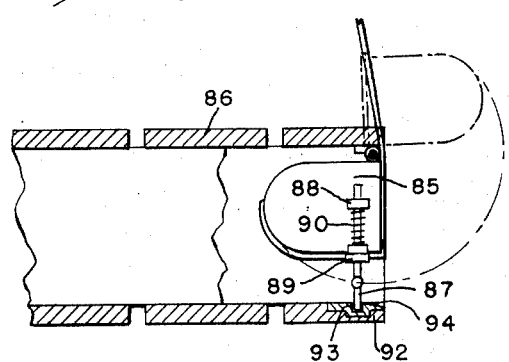
Fig. 13 is a section taken along line 13—13 of Fig. 12.
Figure 12:
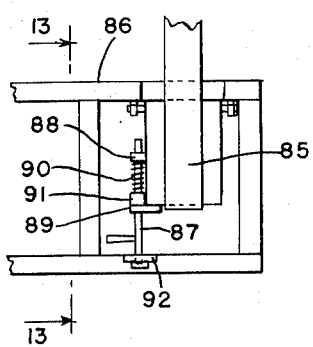
Fig. 12 is an enlarged fragmentary elevational detail showing an attached tensioning device and is taken at a point indicated by the arrow X in Fig. 11.

Figs. 11, 12 and 13 show the application of tensioning devices 85 to a pallet 86. A spring actuated bolt 87, slidable in lugs 88 and 89 secured upon the tensioning device 85 and urged downwardly by a spring 90 disposed between a collar 91 upon the bolt 87 and the stationary lug 89 upon the housing of the tensioning device 85. The lower end of the bolt 87 is engageable in a plate 92 having a recess of socket 93. The said plate 92 is formed at its front end with an incline 94 (Fig. 13) over which the lower end of said bolt 87 may ride when the tensioning device is moved inwardly to tighten the said strap.

I claim:

1. A tie down strap tensioning device, attachable to and adapted to securely hold cartons and the like upon carriers, comprising a housing swingingly mounted upon said carrier, a wind-up spool rotatably mounted upon a stationary shaft within the said housing, a coiled spring within the wind-up spool having one end secured to said stationary shaft and its opposite end secured to the wind-up spool, a flexible strap secured at one end to said wind-up spool and extending outwardly through a slot in the said housing, a hook upon the outer free end of the said strap and adapted to be attached to the nose piece upon the said carrier, the said strap engaging over and with the said cartons upon the carrier, locking means upon the said housing for securing the said wind-up spool against rotation, means for actuating the said locking means for securing said wind-up spool, means for swinging the said housing about its pivotal mounting to tighten the said strap and locking means upon the said housing, engageable with the said carrier, to hold the said housing in place and maintain the said strap taut against the cartons upon the said carrier.

2. A tie down strap tensioning device as set forth in claim 1 wherein the wind-up spool locking means consists of a pin movable in slots formed in said housing and engageable in notches formed in said wind-up spool and a spring secured within the said housing and engageable with the movable pin to urge same into locking position.

3. A tie down strap tensioning device as set forth in claim 2 and the means for actuating the said locking pin consisting of a U-shaped bar pivoted at its free ends to the said housing and having at its opposite end a connecting cross bar, a finger attached by means of a leaf spring to said connecting cross bar and extending outwardly from the said housing through a slot therein, the said slot having a cut out notch at its lower end to receive the finger when same is depressed, the said flat spring attachment means adapted to urge the finger into said cut out notch when the said finger is depressed, the legs of the said U-shaped bar adapted to engage over the said locking pin to force same out of contact with the said wind-up spool when the U-shaped bar is depressed.

4. A tie down strap tensioning device as set forth in claim 2 and wherein the means for locking the said housing against the said carrier when the housing is swung to its strap tightening position, consists of an orificed lip formed upon the said housing and a spring actuated locking rod upon the said carrier.

5. A tie down strap tensioning device as set forth in claim 2 and wherein the means for locking the said housing against the said carrier when the housing is swung to its strap tightening position consists of an orificed lip formed upon the said housing and a spring actuated locking rod upon the said carrier and wherein the housing consists of a base plate having a tubular end portion for attachment to the said carrier, a pair of flanged, upstanding side plates for supporting the said wind-up spool and its locking means, and a flanged encasing unit adapted to engage over the said upstanding side plates, the said flanges upon the said side plates and encasing unit forming a means for securing the parts together.

6. A tie down strap tensioning device as set forth in claim 1 wherein the means for actuating the said locking pin consists of a U-shaped bar pivoted at its free ends to the said housing and having at its opposite end a connecting cross bar, a finger attached by means of a leaf spring to said connecting cross bar and extending outwardly from the said housing through a slot therein, the said slot having a cut out notch at its lower end to receive the finger when same is depressed, the said flat spring attachment means adapted to urge the finger into said cut out notch when the said finger is depressed, the legs of the said U-shaped bar adapted to engage over the said locking pin to force same out of contact with the said wind-up spool when the U-shaped bar is depressed.

7. A tie down strap tensioning device as set forth in claim 1 wherein the means for locking the said housing against the said carrier when the housing is swung to its strap tightening position consists of an orificed lip formed upon the said housing and a spring actuated locking rod upon the said carrier.

8. A tie down strap tensioning device as set forth in claim 1 wherein the housing consists of a base plate having a tubular end portion for attachment to the said carrier, a pair of flanged, upstanding side plates for supporting the said wind-up spool and its locking means, and a flanged encasing unit forming a means for securing the parts together.

HENRY A. G. FORNELIUS.

REFERENCES CITED

The following references are of record in the file of this patent:

UNITED STATES PATENTS

| Number | Name | Date |
| --- | --- | --- |
| 706,034 | Dean et al. | Aug. 5, 1902 |
| 797,076 | Schultz | Aug. 15, 1905 |
| 1,029,471 | Schulte | June 11, 1912 |
| 1,777,784 | Cole | Oct. 7, 1930 |
| 2,165,603 | Yeats | July 11, 1939 |
| 2,449,600 | Geiger | Sept. 21, 1948 |